TRANSISTOR GAIN-BANDWIDTH TEST CIRCUIT

Filed Nov. 15, 1956 2 Sheets-Sheet 1

INVENTOR
W. C. TIMM
BY Kenneth B Hamlin
ATTORNEY

Oct. 20, 1959 W. C. TIMM 2,909,730

TRANSISTOR GAIN-BANDWIDTH TEST CIRCUIT

Filed Nov. 15, 1956 2 Sheets-Sheet 2

INVENTOR
W. C. TIMM
Kenneth B Hamlin
ATTORNEY

United States Patent Office 2,909,730

Patented Oct. 20, 1959

2,909,730

TRANSISTOR GAIN-BANDWIDTH TEST CIRCUIT

Walter C. Timm, Morris Township, Morris County, N.J., assignor to Bell Telephone Laboratories, Incorporated, New York, N.Y., a corporation of New York Application November 15, 1956, Serial No. 622,368

7 Claims. (Cl. 324—158)

This invention relates to transistor testing apparatus and more particularly to methods and arrangements for determining a particular figure of merit which is indicative of a transistor's suitability for use in high speed switching and computing systems.

Generally, transistors are characterized in terms of small signal transmission concepts wherein they are considered to be linear devices operating with small excursions about a fixed bias or operating point. In such situations the transient behavior of the transistor can be quite accurately predicted once an operating or bias point is chosen and the device parameters determined for that point. Unfortunately, however, when a transistor is used as a switch, as in logic and memory arrangements, its transient behavior is obscured by the nonlinearity resulting from the use of large input signals which drive a transistor through its entire operating range from cutoff to saturation.

In signal transmission systems, two circuit parameters are of extreme interest. Namely, these are gain, which overcomes the transmission losses encountered in traversing great distances, and bandwidth which determines the information carrying capacity of a system. Similarly, in switching and computing systems there are two important analogous circuit parameters, namely, gain and speed. In such systems the large transmission losses are absent, but there is the need to fan out and split signals to drive many circuit elements in parallel; therefore, there is the need for gain to overcome the dividing or splitting losses. Furthermore, because many switching and computing work operations are cascaded, the delays in each operation must be minimized in the interest of efficient high speed operation. Consequently the speed of operation or response time of each circuit element is of extreme interest.

The following definitions apply throughout this discussion. System gain, G, shall be taken to mean the ratio of system output signal to system input signal; system bandwidth, $\omega_S$, is an arbitrary term defining the radian frequency at which the system gain, G, is three decibels below the system low frequency gain; transistor current amplification factor or short-circuit gain, $\alpha_N$, is the ratio of transistor output current to transistor input current for a transistor connected in the common base configuration; transistor cutoff radian frequency $\omega_N$, is the radian frequency at which the transistor current amplification factor is three decibels below the transistor low frequency current amplification factor; and speed relates to device response time or, more specifically, the period of time the output signal lags behind the input signal.

In small signal transmission systems, both system gain and system bandwidth are a function of circuit parameters as well as of the parameters of a transistor employed therein. System gain, G, can be sacrificed to obtain additional system bandwidth, $\omega_S$, and vice versa. Consequently, neither transistor short-circuit gain $\alpha_N$ nor transistor cutoff frequency $\omega_N$ alone describes a transistor's suitability for use in a variety of transmission circuit environments. It will be shown in the detailed description that the product of system gain, G, and system bandwidth $\omega_S$ in linear transmission circuits is invariant with changes in circuit parameters, and further that the product of the equations for system gain and for system bandwidth, for each of the various transistor circuit configurations, reduces to the product of transistor current amplification factor and transistor radian cutoff frequency or, specifically, the product $\alpha_N\omega_N$. This product therefore is a small signal transistor figure of merit.

Similarly, in switching and computing systems both system gain, G, and system response time, $T_O$, are dependent upon the circuit parameters as well as upon the parameters of the transistor used therein. However, as will be shown in the detailed description, the response time of a switching or computing circuit employing transistors is proportional to the product of transistor short-circuit gain $\alpha_N$ and transistor cutoff frequency $\omega_N$. It should be noted that $\alpha_N$ and $\omega_N$ both change with the transistor's operating or bias point. Since a transistor in switching and computing arrangements is driven through the entire operating range from cutoff to saturation, the weighted average of the product $\alpha_N\omega_N$ for the entire operating range is of interest and this weighted average, properly labeled $\overline{\alpha_N\omega_N}$, is a large signal figure of merit or parameter indicative of a transistor's suitability for use in high speed nonlinear circuit applications.

It is an object of this invention to economically and accurately evaluate transistors as to their suitability for use in high speed nonlinear circuit applications.

Heretofore transistors have been tested directly in switching and computing circuits to determine their suitability for such service. In such tests the collector current is compared with a step function current input signal and the output signal rise time is measured directly. Although such a test is accurate, it is difficult to measure and record such short rise times without the use of expensive and complex test equipment.

It is a further object of this invention to accomplish transistor evaluation by a simple but reliable method adaptable to the testing of large quantities of such devices by relatively unskilled personnel.

In accordance with the theory of operation of this invention it will be shown that the output wave form measured at the collector of a transistor connected in a common emitter configuration and driven with a large amplitude current pulse applied to the base of the transistor will have the same initial slope as the wave form measured across the capacitor of a properly proportioned integrating network driven by the same large amplitude current pulse. In fact, the weighted gain-band product $\overline{\alpha_N\omega_N}$ is approximately inversely proportional to the R-C product of the integrating network components. In one embodiment of this invention a transistor connected in the common emitter configuration and an R-C integrating network are energized from a common step function current source. The output wave forms derived at the collector of the transistor and across the capacitor of the integrating network comprise input signals to a dual trace oscilloscope in which the horizontal sweep signal is triggered by the same step function input current pulse. The capacitor of the integrating network is variable and in operation its value is varied until a match of the initial slopes of the traces developed by the transistor and the integrating network output signals is obtained. For convenient calibration of the capacitor of the R-C network, the mathematical inverse of the integrated gain-band product $\overline{\alpha_N\omega_N}$ is chosen, and a factor of $2\pi$ is advantageously introduced; therefore by definition the quantity $$\frac{1}{\overline{\alpha_N f_N}}$$

is the inverse gain-band product or IGB. This is a standard device parameter which may be determined in accordance with this invention by relatively simple factory testing methods adaptable to quantity handling of transistors and is extremely useful as it may be employed directly in equations to determine rise time.

In accordance with one feature of this invention, the wave form of the collector voltage or output signal of a transistor amplifier is compared with the charging voltage developed across a variable capacitor in an R-C network and the capacitor, calibrated in terms of IGB values, is varied until the two wave forms have the same initial slope.

In accordance with another feature of this invention both the transistor and the R-C circuit are energized from the same pulse source and the output pulses are treated in similar oscilloscope amplifiers which have a common power supply, thereby minimizing the effects of variations in pulse source amplitude and power supply voltage.

In accordance with another feature of this invention, a switch is coupled to the variable capacitor, which is calibrated in terms of IGB, and connections are provided from the switch to a card-punch recorder for documenting the test results.

The invention and features thereof will be understood more fully and readily from the following detailed description with reference to the drawing, in which.

Figure 2A:
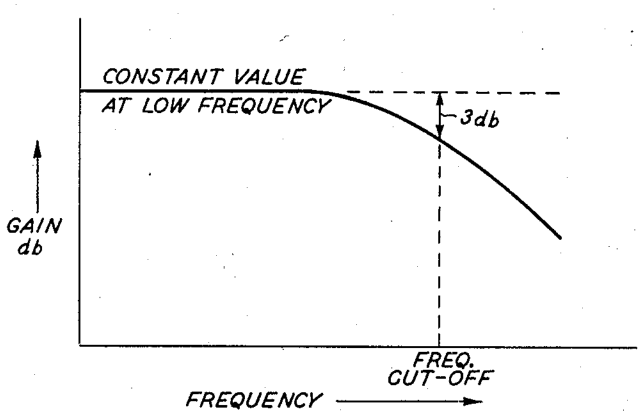
Figs. 2A and 2B are transistor circuit frequency response curves.

The theory of $\alpha_N\omega_N$ as a small signal transistor figure of merit is developed in the following manner: The short-circuit gain-frequency characteristic of a transistor, shown in Fig. 2A, is similar to the loss-frequency characteristic of a low pass filter. The short-circuit gain of the transistor is relatively constant at the lower frequencies and the gain decreases smoothly as the frequency of operation is increased. As previously indicated, for the common base configuration, the frequency at which the transistor gain is 3 decibels below the low frequency short-circuit gain is arbitrarily called the transistor cutoff frequency, $\omega_N$. In accordance with customarily accepted approximations, the following expression applies to a transistor in the common base configuration:

$$G_B=\frac{\alpha_N}{1+j\frac{\omega}{\omega_N}} \qquad (1)$$

where $G_B$ is the short-circuit current gain and $\omega$ is the frequency of operation. The magnitude of $G_B$ as a function of $\omega$ is plotted in Fig. 2B.

Similarly, for the common emitter configuration $$G_E=\frac{G_B}{1-G_B} \qquad (2)$$

where $G_E$ is the short-circuit current gain. By substituting (1), the equation of $G_B$, in Equation 2 we have:

$$G_E=\frac{\frac{\alpha_N}{1-\alpha_N}}{1+j\frac{\omega}{\omega_N(1-\alpha_N)}} \qquad (3)$$

Figure 2B:
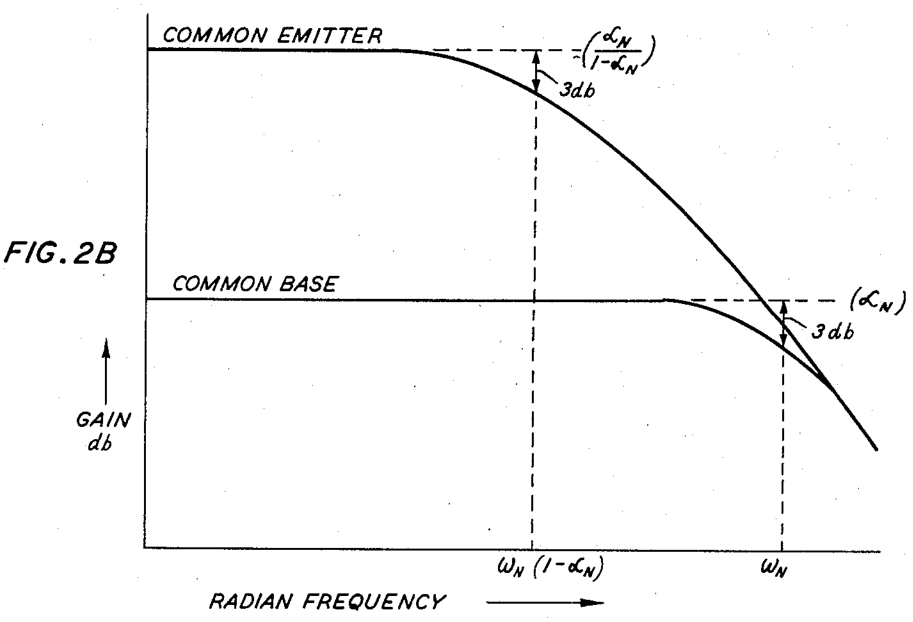

The magnitude of $G_E$ as a function of $\omega$ is also shown in Fig. 2B.

In Equation 1 $\alpha_N$ is considered as gain and $\omega_N$ as bandwidth and the gain bandwidth product for the common base configuration is $\alpha_N\omega_N$. By analogy in Equation 3

$$\frac{\alpha_N}{1-\alpha_N}$$

is held to be gain and $\omega_N(1-\alpha_N)$ as bandwidth, and the gain bandwidth product for the common emitter configuration is again simply $\alpha_N\omega_N$.

The common base and the common emitter configurations are the two extremes. The common emitter configuration can be considered as a common base arrangement with full positive feedback. The effect of positive feedback being to increase the gain and decrease the bandwidth, wtih the gain bandwidth product remaining constant as shown above. In consideration of a situation intermediate to the above extremes, we have the case in which a common emitter configuration is arranged to have a fraction, *m*, of the output signal fed back to the input. In this case $$G_I=\frac{\frac{\alpha_N}{1+(m-1)\alpha_N}}{1+j\frac{\omega}{\omega_N[1+(m-1)\alpha_N]}} \qquad (4)$$

where $G_I$ is the short-circuit current gain. Treating $$\frac{\alpha_N}{1+(m-1)\alpha_N}$$

as gain and $\omega_N[1+(m-1)\omega_N]$ as bandwidth, the gain bandwidth product for the intermediate case is also $\alpha_N\omega_N$.

By the foregoing, it is shown that circuit gain and bandwidth individually are not determined by the parameters of a transistor, but that the product of circuit gain and bandwith in each circuit configuration is $\alpha_N\omega_N$. It is also shown that gain can be sacrificed to obtain additional bandwidth and vice versa.

The approximate equations of rise time for transistors connected in the various circuit configurations are developed in an article by J. L. Moll entitled "Large Signal Transient Response of Junction Transistors" which appeared in the proceedings of the IRE, volume 42, pages 1773–1783, December 1954. These equations are limited to circuits in which the transistor is driven by a step function current pulse and the load resistance is low enough to nullify the effects of collector capacitance. The equations of rise time will be used directly herein without further development. In these equations all prior noted definitions apply and in addition $T_O$ is rise time or, more specifically, the interval between the time of application of a step function input pulse and the instant at which the output current reaches nine-tenths of its final value; $I_C$ is the maximum collector current and its magnitude is equal to the collector supply voltage divided by the load resistance; $I_E$ is the magnitude of the step function emitter driving current; and $I_B$ is the magnitude of the step function base driving current. For the common base configuration $$T_{OB}=\frac{1}{\omega_N}\ln\frac{1}{1-0.9\frac{I_C}{\alpha_N I_E}} \qquad (5)$$

and for the common emitter configuration $$T_{OE}=\frac{1}{\omega_N(1-\alpha_N)}\ln\frac{1}{1-0.9\frac{I_C}{I_B}\cdot\frac{1-\alpha_N}{\alpha_N}} \qquad (6)$$

If the driving signal is limited to restrict the transistor operation to the linear region then, $$\frac{I_C}{I_E}=\alpha_N=G_{LB} \qquad (7)$$

for the common base connection, and $$\frac{I_C}{I_B}=\frac{\alpha_N}{1-\alpha_N}=G_{LE} \qquad (8)$$

for the common emitter connection. These are the equations of linear or highest position gain for the respective connections.

The substitution of Equations 7 and 8 in Equations 5 and 6 respectively yields the following expressions which are applicable to cases where operation is entirely in the active or linear region;

$$T_{OB}=\frac{1}{\omega_N}\ln 10=\frac{2.3}{\omega_N} \qquad (9)$$

$$T_{OE}=\frac{1}{\omega_N(1-\alpha_N)}\ln 10=\frac{2.3}{\omega_N(1-\alpha_N)} \qquad (10)$$

From Equations 7, 8, 9, and 10 it is seen that the common base connection yields low gain and high speed and the common emitter connection has high gain and low speed when operation in each case is limited to the linear region. These arrangements are again the two extreme cases, and if the transistor is driven into saturation or if some equivalent limiting process is permitted, speeds and gains intermediate to these extremes can be obtained. Equations 5 and 6 hold in the intermediate cases; however, Equations 7 and 8 do not apply. If saturation or limiting is permitted then $I_C$ becomes the saturation or limited value and the ratio of $$\frac{I_C}{I_E}$$

and $$\frac{I_C}{I_B}$$

are the actual gain as opposed to the linear gain and are identified as $G_{AB}$ and $G_{AE}$ respectively.

The equation of rise time $$T_O=\frac{G_L}{\alpha_N\omega_N}\ln\frac{1}{1-0.9\frac{G_A}{G_L}} \qquad (11)$$

applies to both the common base and common emitter connections when saturation or limiting is permitted. In this equation $G_L$ is linear system gain and $G_A$ is actual system gain in both the common base and common emitter connections. Equation 11 can be rearranged to read $$T_O=\left(\frac{0.9G_A}{\alpha_N\omega_N}\right)\left(\frac{1}{\frac{0.9G_A}{G_L}}\ln\frac{1}{1-0.9\frac{G_A}{G_L}}\right) \qquad (12)$$

The second factor of Equation 12 is of the form $$\frac{1}{x}\ln\frac{1}{1-x}$$

which can be expanded in the following series $$1+\frac{x}{2}+\frac{x^2}{3}+\cdots$$

If this series is terminated with the first term then $$T_O=\frac{0.9G_A}{\alpha_N\omega_N} \qquad (13)$$

This is a useful approximation which incurs little error in the calculation of rise time. For example, if the actual gain, $G_A$, is only one-tenth the linear gain $G_L$, the error in calculated rise time is only 5 percent.

Equation 13 shows that rise time of a circuit is not determined alone by the usual small signal transistor parameters but rather is dependent largely upon the circuit itself, as evidenced by the factor $G_A$, which is strictly a circuit parameter. The familiar product $\alpha_N\omega_N$ is, however, found in the denominator and has been previously noted to be a property or parameter of the transistor.

Equation 13 can be rewritten to read $$\frac{G_A}{T_O}=\frac{\alpha_N\omega_N}{0.9} \qquad (14)$$

This is a circuit gain time ratio or a gain speed product which is similar to the gain-band product of a transmission system. The product $\alpha_N\omega_N$ thus is a device parameter of interest in both the transmission and switching or computing fields.

As previously explained the main difference between transmission and switching circuits lies in the conditions of operation. In transmission circuits, for other than power amplifier applications, a bias or operating point is chosen and small excursions are made about this point. In switching circuits the entire transistor operating range is traversed and the effective values of the device parameters over the entire range of operation are of interest. While the parameter $\alpha_N\omega_N$ is useful in both types of circuitry, the value of this parameter is specified by the chosen operating or bias point in transmission circuits, while in switching or computing arrangements the product of interest is a weighted average over the entire region of bias points traversed and as previously noted is labeled $\overline{\alpha_N\omega_N}$. Equation 13 therefore should be written $$\frac{G_A}{T_O}=\frac{\overline{\alpha_N\omega_N}}{0.9} \qquad (15)$$

Figure 1:
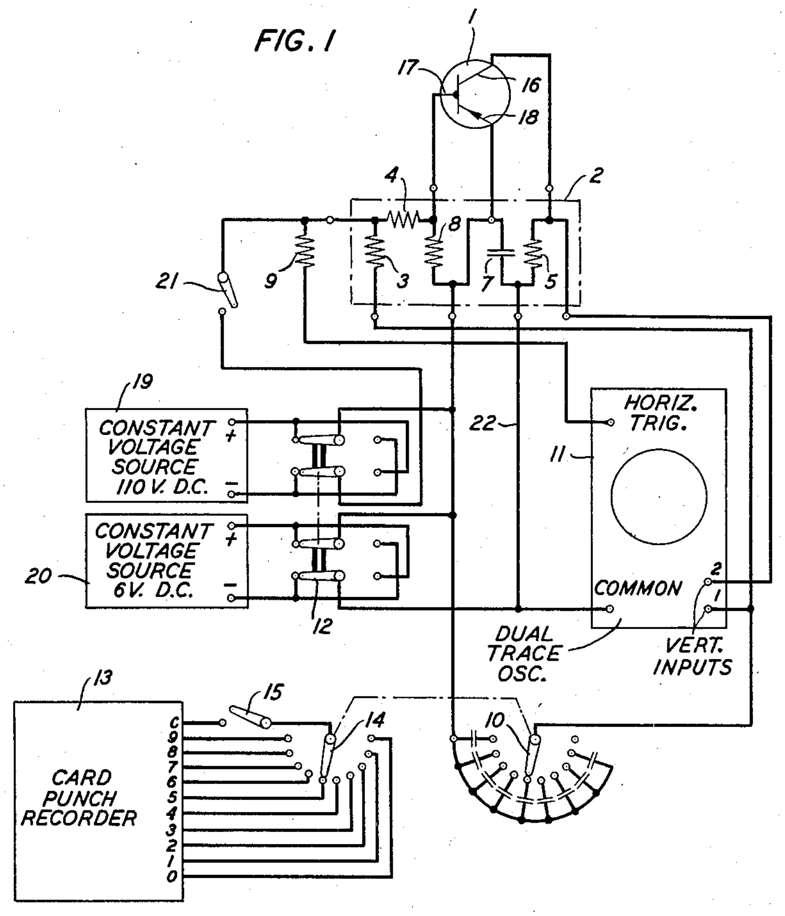
Fig. 1 is a schematic diagram illustrative of one embodiment of this invention.

A method to determine a numerical value representative of the weighted or integrated gain-band product $\overline{\alpha_N\omega_N}$ is implemented by the illustrative embodiment of this invention which is shown in Fig. 1. This particular embodiment is calibrated in terms of the transistor parameter Inverse Gain-Bandwidth which by definition is $$\frac{1}{\alpha_N f_N}$$

Fig. 1 shows the transistor 1 which is under test, the plug-in unit 2 which receives the transistor and comprises capacitor charging resistor 3, base resistor 4, load resistor 5, bypass capacitor 7, and shunting resistor 8, and returning outside the plug-in unit there is oscilloscope trigger resistor 9, variable match capacitor 10, dual trace oscilloscope 11, switch 12 which arranges the set to test P-N-P or N-P-N transistors, card-punch recorder 13 which is used to record test data, switch 14 which is mechanically connected to the variable capacitor 10, and switch 15 which when operated energizes the recorder 13.

Figure 2C:
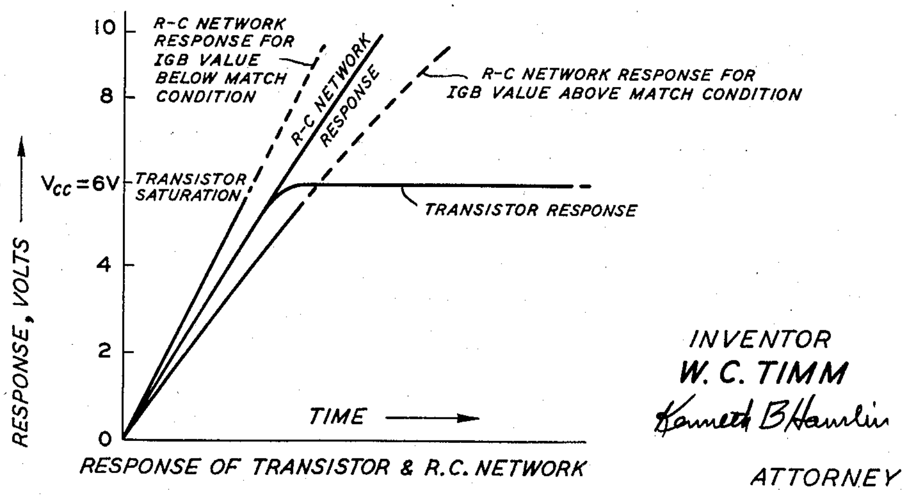
Fig. 2C is an example of the wave forms which are presented on the oscilloscope of Fig. 1.

The transistor 1 under test is connected to the plug-in unit 2 which provides connections between the transistor and the power sources. The plug-in unit contains connections and components which advantageously place the transistor 1 in the common emitter configuration. Resistor 5 is the load resistor for the transistor and is connected between the collector electrode 16 and the negative terminal of the voltage source 20. The transistor shown under test is of the P-N-P type, therefore the collector-to-base junction is properly back-biased. The positive terminals of the voltage sources 19 and 20 are connected together and they constitute the common point of the system. The emitter electrode 18 is connected directly to this common point. The base resistor 4 connected between switch 21 and base electrode 17 has a high resistance compared to the internal impedance of constant voltage source 19 and the impedance of the transistor base. Consequently, when switch 21 is closed, the amplitude of the current pulse delivered to the base electrode 17 is relatively independent of minor variations in the amplitude of the voltage source 19. The resistor 8 has a resistance value which is large compared to the forward-biased impedance of the base emitter junction of transistor 1; however, its resistance is small compared with resistor 4. This resistor provides a path for the transistor leakage currents. The capacitor 7 is a bypass element designed to keep disturbances, occasioned by the rapid switching of the transistor, from leaving the plug-in unit via conductor 22 which is connected to the negative terminal of voltage source 20. Resistor 3 is the charging resistor for variable capacitor 10 and is therefore a major element of the R-C circuit. These elements have been included in the plug-in unit so that the physical length of conductors connecting critical elements be kept at a minimum length and in a fixed relationship. By encapsulating these components several plug-in units can be provided to accommodate the testing of various transistor types. The resistor 9 provides a connection between the pulse source and the horizontal triggering input terminal of the oscilloscope 11. The junction of charging resistor 3 and variable capacitor 10, the point at which the capacitor voltage is measured, is connected to oscilloscope vertical input terminal 1. The other side of capacitor 10 is connected to the system common point. The junction between collector electrode 16 and load resistor 5, the point at which the transistor output is measured, is connected to the oscilloscope vertical input 2. In operation the switch 21 is alternately closed and opened and the value of capacitor 10 is varied until a match of the initial slope of the wave forms of the transistor output and the capacitor charging voltage coincide. When coincidence is obtained, as shown in Fig. 2C, the operator closes switch 15 which energizes card-punch recorder 13, and since switch 14 is mechanically coupled to variable capacitor 10 its setting will indicate the test results to the recorder.

When the traces of the initial slopes match, $$IGB=kRC \qquad (16)$$

where $k$ is a proportionality constant. The theoretical development of this relationship is conducted in two parts, calculation of the transistor response and calculation of the passive R-C network response. These responses will be derived and the results compared.

The transistor 1 is connected in a common emitter configuration and is driven by a step of input base current. The load resistance 5 is deliberately made as low as possible to eliminate the effect of collector capacitance.

The transfer function of the transistor in the active region is simply:

$$\frac{I_c(s)}{I_B(s)}=\frac{\alpha(s)}{1-\alpha(s)} \qquad (17)$$

The true functional form of $\alpha(s)$ is a hyperbolic function of the square root of $s$. Because this is a difficult form to handle, the following approximation is made:

$$\alpha(s)=\frac{\alpha_N}{1+\frac{s}{\omega_N}} \qquad (18)$$

where $\omega_N=2\pi f_a$, the arbitrary radian frequency cutoff of $\alpha$. This appears to be a reasonable approximation on which to proceed.

The step function of supply voltage, provided by closing switch 21, is represented by $$\frac{V}{s}$$

The base current therefore is equal to this divided by the value of base resistor 4 represented as $R_B$:

$$I_B(s)=\frac{V}{R_Bs} \qquad (19)$$

The output voltage measured at the junction of collector electrode 16 and load resistor 5 is equal to the collector current $I_c$ multiplied by the value of the load resistor 5 herein represented as $R_L$:

$$V_T(s)=I_c(s)R_L \qquad (20)$$

Assembling the above equations yields the Laplace transform of the output voltage:

$$V_T(s)=\frac{\alpha_N\omega_NVR_L}{R_B}\cdot\frac{1}{s[s+\omega_N(1-\alpha_N)]} \qquad (21)$$

The inverse transform of the above yields the desired transistor response which is as follows:

$$v_T(t)=\frac{\alpha_NVR_L}{(1-\alpha_N)R_B}[1-e^{-\omega_N(1-\alpha_N)t}] \qquad (22)$$

This expression is valid until the transistor saturates.

The Laplace transform of the voltage appearing across the capacitor of an R-C circuit energized by a step function current pulse is of the form:

$$V_{RC}(s)=\frac{V}{RC}\frac{1}{s\left[s+\frac{1}{RC}\right]} \qquad (23)$$

The corresponding time function is $$v_{RC}(t)=V\left[1-e^{-\frac{t}{RC}}\right] \qquad (24)$$

The transient responses of the transistor and the R–C circuit, $v_T(t)$ and $v_{RC}(t)$ respectively, are viewed together on the dual trace oscilloscope 11. In such an arrangement, there is a possibility of different deflection coefficients for the two wave forms. These must be taken into account.

Let the two coefficients be $k_T$ and $k_{RC}$ as follows:

$$y_T=k_Tv_T \qquad (25)$$

$$y_{RC}=k_{RC}v_{RC} \qquad (26)$$

where the $y$'s are the associated oscilloscope deflections. The deflections then become $$y_T(t)=\frac{\alpha_NVR_L}{(1-\alpha_N)R_B}k_T[1-e^{-\omega(1-\alpha_N)t}] \qquad (27)$$

and $$y_{RC}(t)=Vk_{RC}\left[1-e^{-\frac{t}{RC}}\right] \qquad (28)$$

Now, $y_T(t)$ is a function of both $\alpha_N$ and $\omega_N$, which complicates matters. For a perfect match of the entirety of the two traces, $$\frac{\alpha_NR_Lk_T}{(1-\alpha_N)R_B}=k_{RC} \qquad (29)$$

and $$\omega_N(1-\alpha_N)=\frac{1}{RC} \qquad (30)$$

Both these equations represent an unsatisfactory situation. Equation 29 indicates that the constants of the test set must be altered for every transistor, and altered radically because $(1-\alpha_N)$ is very sensitive, $\alpha_N$ being close to unity. Equation 30 indicates that the test set is not measuring $\omega_N$, but $\omega_N(1-\alpha_N)$. Again the sensitive factor $(1-\alpha_N)$ appears, exposing the user to the possibility of error in calculating $\omega_N$.

As shown below, a more satisfactory result is obtained if the initial slopes of the transient responses are matched rather than trying to obtain a match of the entire responses. The first derivatives of 27 and 28 are respectively;

$$\frac{dy_T}{dt}=\frac{\alpha_N\omega_NVR_Lk_T}{R_B}e^{-\omega_N(1-\alpha_N)t} \qquad (31)$$

$$\frac{dy_{RC}}{dt}=\frac{VK_{RC}}{RC}e^{-\frac{t}{RC}} \qquad (32)$$

Now the relationship which must exist among the parameters for a match of initial slopes will be derived. The initial first derivatives are respectively $$\left.\frac{dy_T}{dt}\right|_{t=0}=\frac{\alpha_N\omega_NVR_Lk_T}{R_B} \qquad (33)$$

$$\left.\frac{dy_{RC}}{dt}\right|_{t=0}=\frac{Vk_{RC}}{RC} \qquad (34)$$

These are equal when $$RC=\frac{k_{RC}}{k_T}\frac{R_B}{R_L}\frac{1}{\alpha_N\omega_N} \qquad (35)$$

Now, $$IGB=\frac{1}{\alpha_Nf_\alpha}=\frac{2\pi}{\alpha_N\omega_N} \qquad (36)$$

Then, $$RC=\left(\frac{1}{2\pi}\frac{k_{RC}}{k_T}\frac{R_B}{R_L}\right)IGB \qquad (37)$$

The multiplicative constant of Equation 1 has now been derived, being $$k=\frac{2\pi k_T R_L}{k_{RC} R_B} \qquad (38)$$

Notice particularly that the amplitude V of the voltage source 19 has canceled out of the result, hence the accuracy of the test set is not influenced by variations in this voltage.

It is to be understood that the above described arrangements are illustrative of the application of the principles of the invention. Numerous other arrangements may be devised by those skilled in the art without departing from the spirit and scope of the invention.

What is claimed is:

1. A test circuit for testing a transistor having a base, an emitter and a collector, comprising a first constant voltage direct current power source, a second constant voltage direct current power source, one polarity of said first source connected to one polarity of said second source to form a system common point, said emitter connected to said common point, a load resistor connected between said collector electrode and the other polarity of said second direct current power source, a base resistor connected to said base electrode of said transistor, a switch connected between the free end of said base resistor and the other polarity of said first direct current power source, an integrating network comprising a charging resistor and an integrating capacitor, one terminal of said charging resistor connected to the junction of said switch and said base resistor, said integrating capacitor connected between the free end of said charging resistor and the system common point, an oscilloscope including two vertical deflection channels, a horizontal oscillator triggering input terminal and a common terminal, said common terminal connected to said other polarity of said second direct current power source, the first of said vertical channels connected to the junction of said resistor and said integrating capacitor, the second of said vertical channels connected to said collector, and a triggering resistor connected between said oscilloscope horizontal triggering terminals and the junction of said switch and said base resistor.

2. The test circuit as claimed in claim 1 wherein said charging resistor is adjustable.

3. The test circuit as claimed in claim 1 wherein said integrating capacitor is adjustable.

4. The test circuit as claimed in claim 1 in combination with means to record the test data.

5. A test circuit for determining the inverse gain bandwidth of a transistor comprising means for connecting a transistor in the common emitter configuration, an integrating network, means for energizing said transistor with a step function current pulse, means for concurrently energizing said integrating network with said step function current pulse, a dual trace oscilloscope, means connecting said transistor to one vertical channel of said oscilloscope, means connecting said integrating network to the other vertical channel of said oscilloscope, and means for triggering the horizontal sweep oscillator of said oscilloscope with said step function current pulse.

6. A test circuit for determining the inverse gain bandwidth of a transistor comprising means for connecting a transistor in the common emitter configuration, an integrating network, means for energizing said transistor with a step function current pulse, means for concurrently energizing an integrating network with said step function current pulse, and means connected to said transistor and to said integrating network for indicating a match between the first derivative of the output current of said transistor and the first derivative of the current in said integrating network.

7. A test circuit in accordance with claim 6 further comprising means for energizing said last mentioned means concurrent with the energization of said transistor and integrating network whereby said match is obtained on the initial currents on energization of said transistor and integrating network.

References Cited in the file of this patent

UNITED STATES PATENTS

| | | |
|---|---|---|
| 2,590,116 | Moland | Mar. 25, 1952 |
| 2,794,952 | Golden et al. | June 4, 1957 |

OTHER REFERENCES

Journal of Scientific Instruments, vol. 29, May 1952, pp. 142–145, article by Chaplin et al.